No. 698,990. Patented Apr. 29, 1902.
A. G. MORRIS.
CRUSHER.
(Application filed Feb. 23, 1901.)
(No Model.) 4 Sheets—Sheet 1.
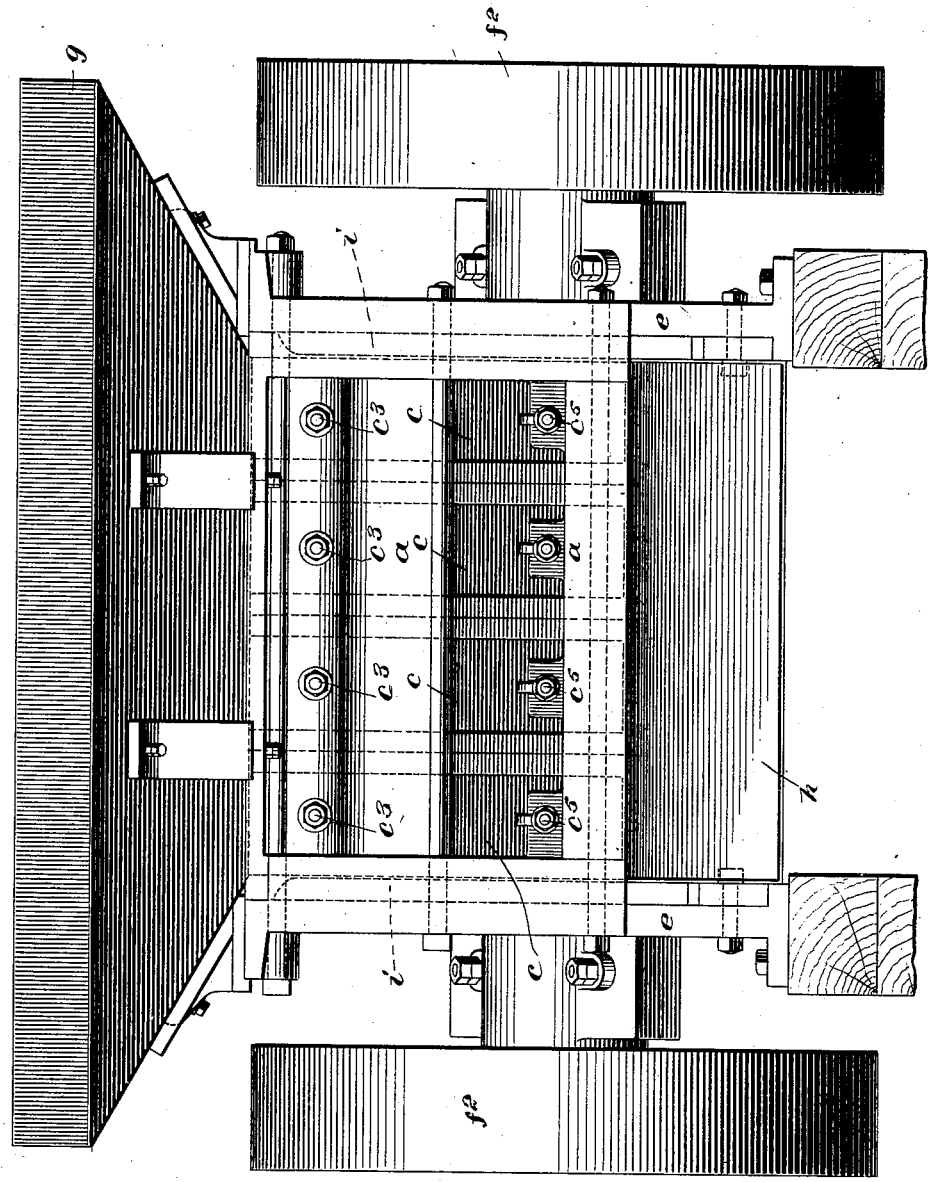
WITNESSES:
Edward Thorpe
I. B. Owens.
INVENTOR
Alexander G. Morris
BY
ATTORNEYS

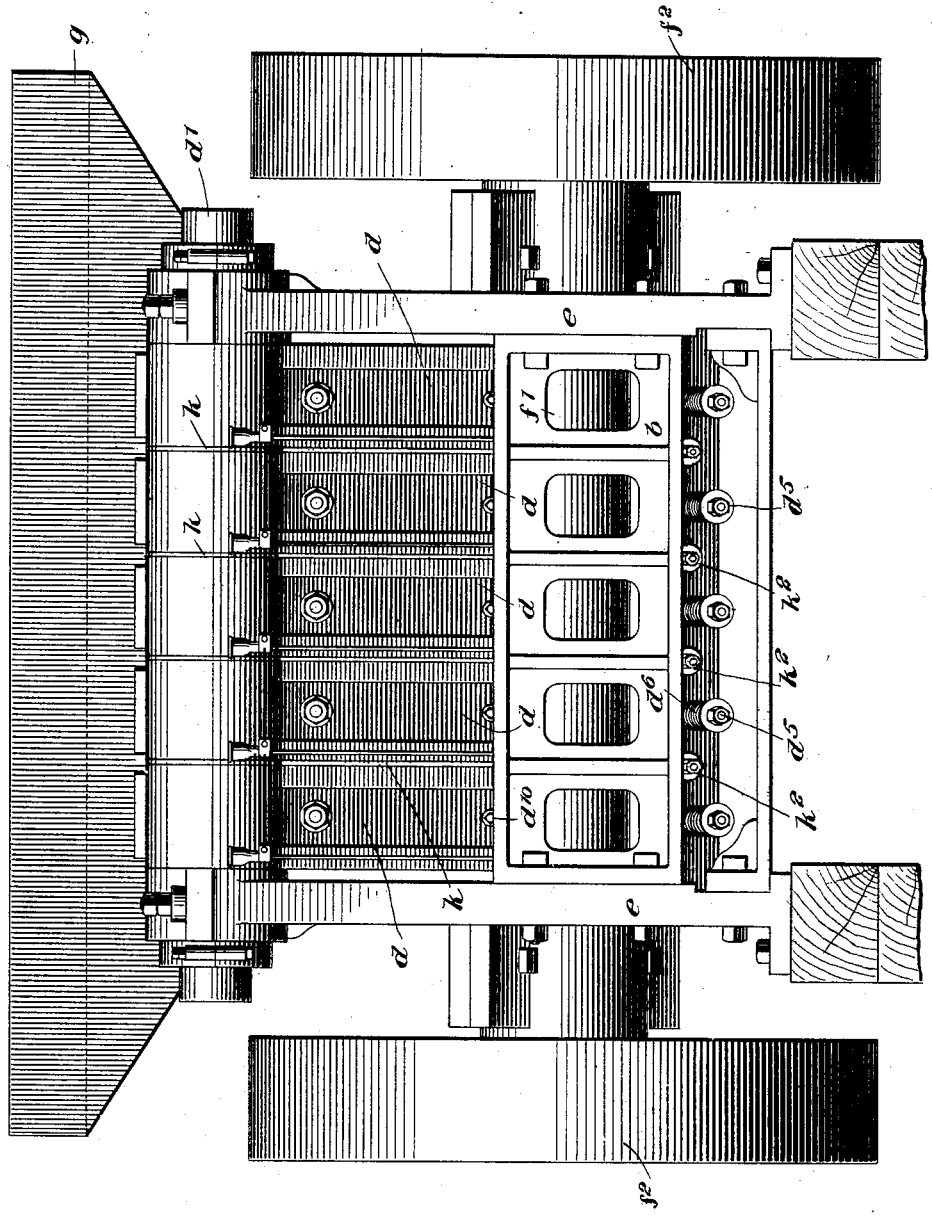

No. 698,990. Patented Apr. 29, 1902.
A. G. MORRIS.
CRUSHER.
(Application filed Feb. 23, 1901.)
(No Model.) 4 Sheets—Sheet 3.
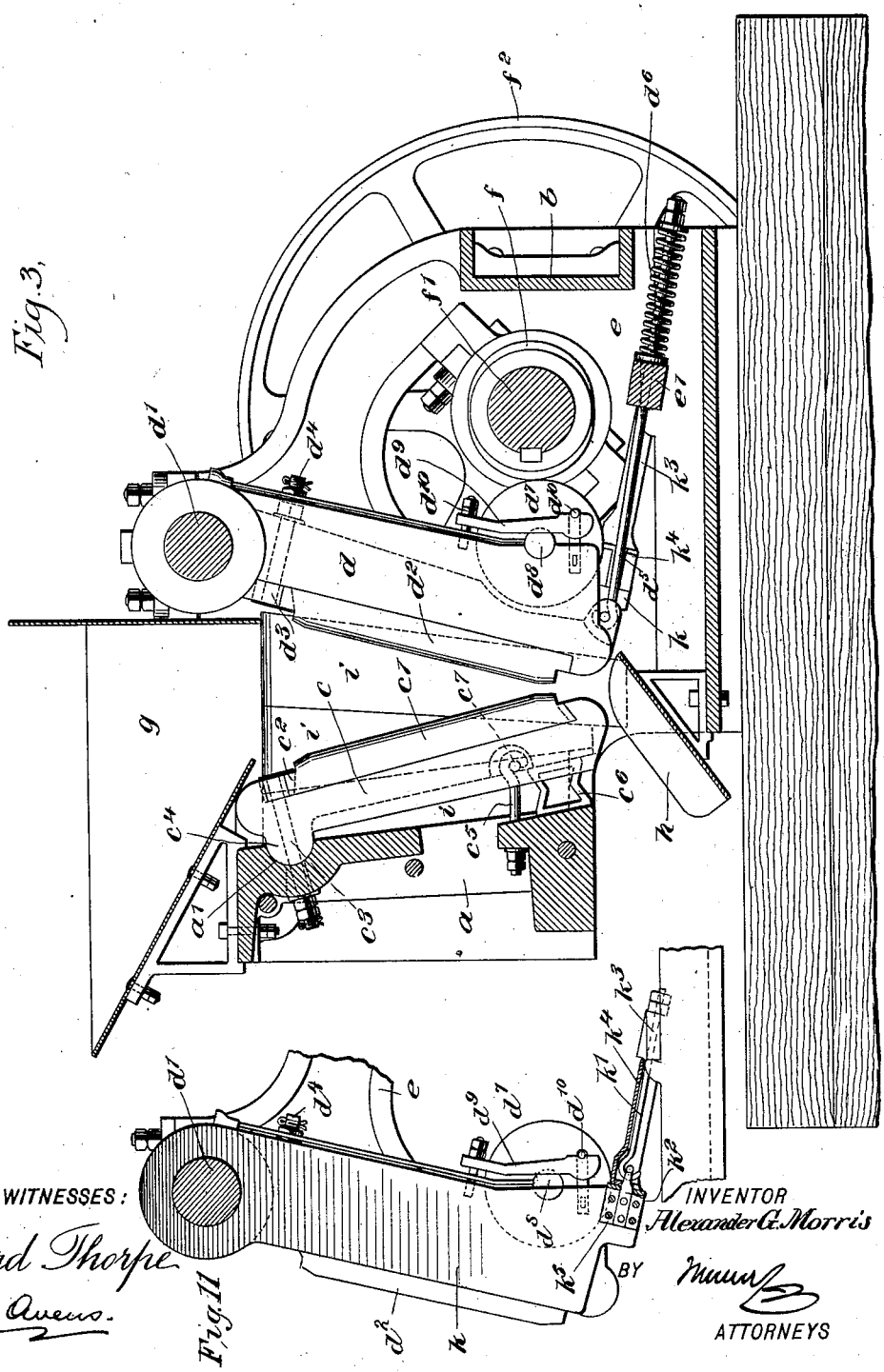

No. 698,990. Patented Apr. 29, 1902.
A. G. MORRIS.
CRUSHER.
(Application filed Feb. 23, 1901.)
(No Model.) 4 Sheets—Sheet 4.
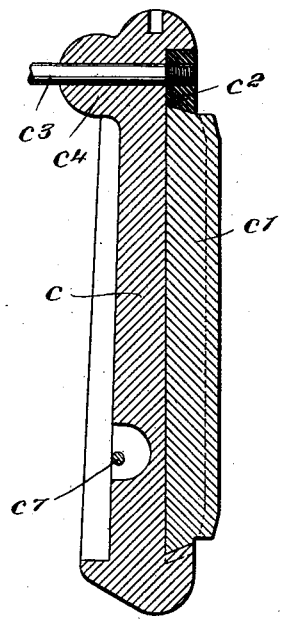
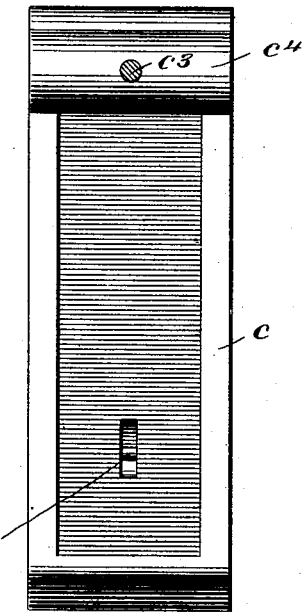
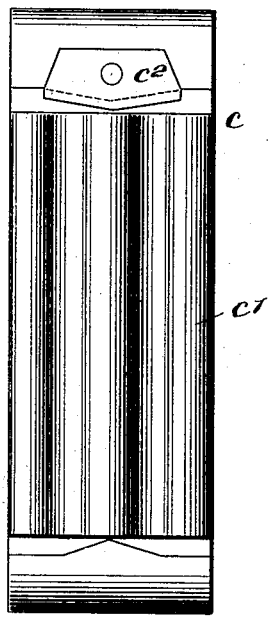
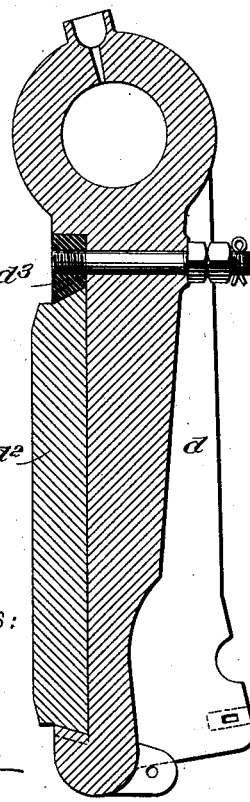
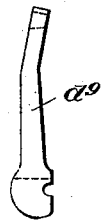
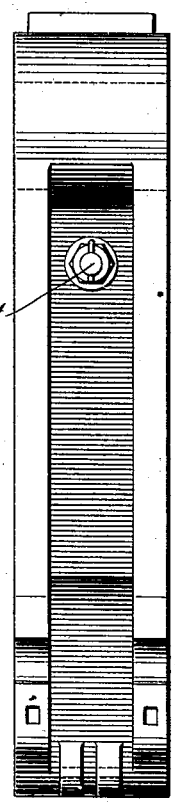
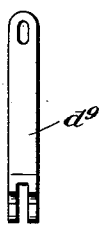
WITNESSES:
Edw. Thorpe
J. H. Owens.
INVENTOR
Alexander G. Morris
By
Munn
ATTORNEYS

UNITED STATES PATENT OFFICE.

ALEXANDER G. MORRIS, OF TYRONE, PENNSYLVANIA.

CRUSHER.

SPECIFICATION forming part of Letters Patent No. 698,990, dated April 29, 1902.

Application filed February 23, 1901. Serial No. 48,473. (No model.)

*To all whom it may concern:*

Be it known that I, ALEXANDER G. MORRIS, a citizen of the United States, and a resident of Tyrone, in the county of Blair and State of Pennsylvania, have invented a new and Improved Crusher, of which the following is a full, clear, and exact description.

This invention relates to a crusher for breaking rock, ore, and like material into fine particles, and it is of that class in which two jaws are provided, one of the jaws being movable toward and from the other and working with mechanism for operating it, so that the rock or other material is crushed.

This specification is a specific description of one form of the invention, while the claims are definitions of the actual scope thereof.

Reference is to be had to the accompanying drawings, forming a part of this specification, in which similar characters of reference indicate corresponding parts in all the views.

Figure 1 is a front view of the apparatus. Fig. 2 is a rear view thereof. Fig. 3 is a longitudinal section of the same. Figs. 4, 5, and 6 are detail views of one of the stationary jaws. Figs. 7 and 8 are detail views of one of the movable jaws. Figs. 9 and 10 are detail views of one of the keys for holding in place the rollers on the movable jaws, and Fig. 11 is a detail view of one of the division-plates and the devices for holding them.

The frame of the apparatus is formed in four parts—namely, a front section $a$, a rear section $b$, and side sections $e$. These parts are rigidly fastened together by bolts or other securing devices, as shown. According to the construction here illustrated I provide four stationary jaws $c$, (see Fig. 1,) which work with five movable jaws $d$. (See Fig. 2.) The stationary jaws $c$ are provided with removable working faces $c'$, held in place by clamps $c^2$ engaging their upper ends, these clamps being in turn secured by bolts $c^3$, which pass through the upper ends of the jaws $c$ and through the front section $a$ of the frame to serve the double purpose of holding the jaws and clamps in place. The upper portions of the jaws $c$ are provided with transverse extensions $c^4$, which fit into corresponding cavities $a'$ in the front section $a$ of the frame, so as to form a secure connection coacting with the bolts $c^3$. The jaws $c$ are held at the proper inclination by means of the hook-bolts $c^5$ working in connection with spacers $c^6$. The spacers $c^6$ are one for each jaw $c$, and they bear between the jaws and the lower portions of the front section $a$ of the frame. The hook-bolts $c^5$ are engaged with pins $c^7$ on the jaws $c$ and also with the said lower portion of the front section $a$ of the machine-framing. By placing spacers $c^6$ of various sizes in position, as shown, the position of the stationary jaws may be regulated, and, further, these spacers may be made to act as safety devices for the machine to prevent the destruction of the machine by overloading it. This is accomplished by constructing the spacers $c^6$ of such strength that they will stand the strain of that load which it is desired the crusher shall bear; but should the crusher be overloaded the strength of the spacers $c^6$ will be exceeded and these spacers will fracture and give way, thus relieving the machine of its load and preventing the destruction of other and more expensive parts of the apparatus. By locating the spacers $c^6$ at the lower or discharge end of the jaw upon the fracture of the spacers the machine opens at this point and the uncrushable body will fall out. The arrangement of the parts $c^4$ and $c^3$ facilitates this operation, the bolt $c^3$ being slightly movable in the frame $a$. (See dotted lines in Fig. 3.)

Mounted transversely in the machine and carried in bearings formed on the side sections $e$ of the frame thereof is a shaft $d'$, which carries the movable jaws $d$, such jaws being mounted to swing toward and from the stationary jaws $c$. The jaws $d$ are provided with removable wear-plates $d^2$, held in position by clamps $d^3$, similar to the clamps $c^2$, these clamps being in turn held in position by bolts $d^4$, which pass through the jaws $d$, as shown. The lower ends of the swinging jaws $d$ are yieldingly held away from the stationary jaws by rods $d^5$, which are engaged with the lower ends of the jaws and which pass through a transverse bar $e'$, extending between the frame-sections $e$. The rods $d^5$ carry expansive spiral springs $d^6$, which act on the rods to draw the jaws $d$ to the right in Fig. 3. Each jaw $d$ carries a roller-wheel $d^7$, which wheels are mounted loosely on short shafts $d^8$, respectively held rigidly by the movable jaws, these shafts being so held by keys $d^9$, which bear on plane surfaces formed on the shafts $d^8$ and which are held at each end by fastening devices $d^{10}$, such devices extending between the ends of the keys $d^9$ and the jaws $d$.

The jaws $d$ are operated through the action of eccentrics $f$, carried on a primary movement-shaft $f'$, mounted in bearings carried by the frame-sections $e$. These eccentrics $f$ may be of any form suitable to the movement which it is desired to impart to the jaws, and they are one for each of the movable jaws. The shaft $f'$ is provided with band-pulleys $f^2$ or other devices for facilitating imparting movement to the shaft. As the shaft $f'$ is driven with a rotary movement, the eccentrics act on the wheels $d^7$ and the movable jaws $d$ are given an oscillating movement toward and from the stationary jaws $c$, the return of the movable jaws being effected by the action of the springs $d^6$, previously described.

The machine is provided with a suitable feed-hopper $g$, arranged at the top thereof and serving to deliver the crude rock into the space between the jaws, and below the jaws at the discharge end of the machine a spout or chute $h$ is arranged to direct the crushed rock toward the forward side of the machine. At the sides of the jaws $c$ and $d$ and held fast against the inner walls of the sections $e$ of the frame of the machine are wear-plates $i$, which form a surface against which the rock may bear when being crushed and which thereby act to protect the frame of the machine from the destructive action of the rock when under crushing pressure. These wear-plates $i$ are formed in sections, preferably three, as indicated best in Fig. 3, and are removably placed in the machine. When the wear-plates are destroyed, they may be readily replaced.

Fitted between each jaw $d$ is a stationary division-plate $k$, preferably of steel. These plates serve to separate the jaws and reduce the friction due to their movement, since they avoid the rubbing of the jaws against each other, one jaw moving backward and another moving oppositely at the same time. These plates $k$ are hung on the shaft $d'$ and are held at their lower ends by hook-bolts $k'$, engaged at one end with eyes $k^2$ on the plates $k$, and at the other end with a spring-bar $k^3$ on the framing of the machine. Over the bolt $k'$ is dropped a spacer $k^4$ in the form of an inverted trough, and this spacer bears between studs $k^5$, fastened to the plates $k$ and the spring-bar $k^3$, all of the parts being held in firm engagement by the pressure of the nuts on the bolts $k'$.

Having thus described my invention, I claim as new and desire to secure by Letters Patent—

1. A crusher having a frame, a stationary jaw, a removable wear-plate fitted thereon, a clamp holding the wear-plate in position, and a bolt engaging the clamp and passing into connection with the frame of the machine to hold the clamp and the jaw both rigidly in place.

2. A crusher having a frame, a stationary jaw provided at its upper portion with a lateral projection set into a cavity in the frame, a bolt passing through said projection of the jaw and engaging the jaw and frame to hold the former in position, said bolt being capable of slight sidewise movement in the frame to allow the jaw to swing, and a fracturable spacer set against the lower portion of the jaw, for the purpose specified.

3. A crusher, comprising a frame, diversely-movable jaws swinging on a common axis, division-plates hung from said axis and situate between the jaws, means for moving the jaws, and means connected to the frame and division-plates to hold the plates stationary.

4. A crusher having a frame, a stationary jaw, means for holding the upper end of the jaw on the frame, such means permitting the jaw a slight swinging movement, and a fracturable spacer set between the lower part of the jaw and the frame.

In witness whereof I have signed my name to this specification in the presence of two subscribing witnesses.

ALEXANDER G. MORRIS.

Witnesses:
 J. B. CAMPBELL,
 GEO. C. WILSON.